O. N. TEVANDER & A. MANIERRE.

METHOD OF SEALING BOTTLES.

APPLICATION FILED JUNE 6, 1910.

Reissued Jan. 3, 1911.

13,190.

2 SHEETS—SHEET 1.

Witnesses:
Ed. C. Davison
Maurice Goldberger

Inventors:
Olof N. Tevander
Arthur Manierre,
By G. L. Gregg Atty.

O. N. TEVANDER & A. MANIERRE.
METHOD OF SEALING BOTTLES.
APPLICATION FILED JUNE 6, 1910.
Reissued Jan. 3, 1911.
13,190.
2 SHEETS—SHEET 2.
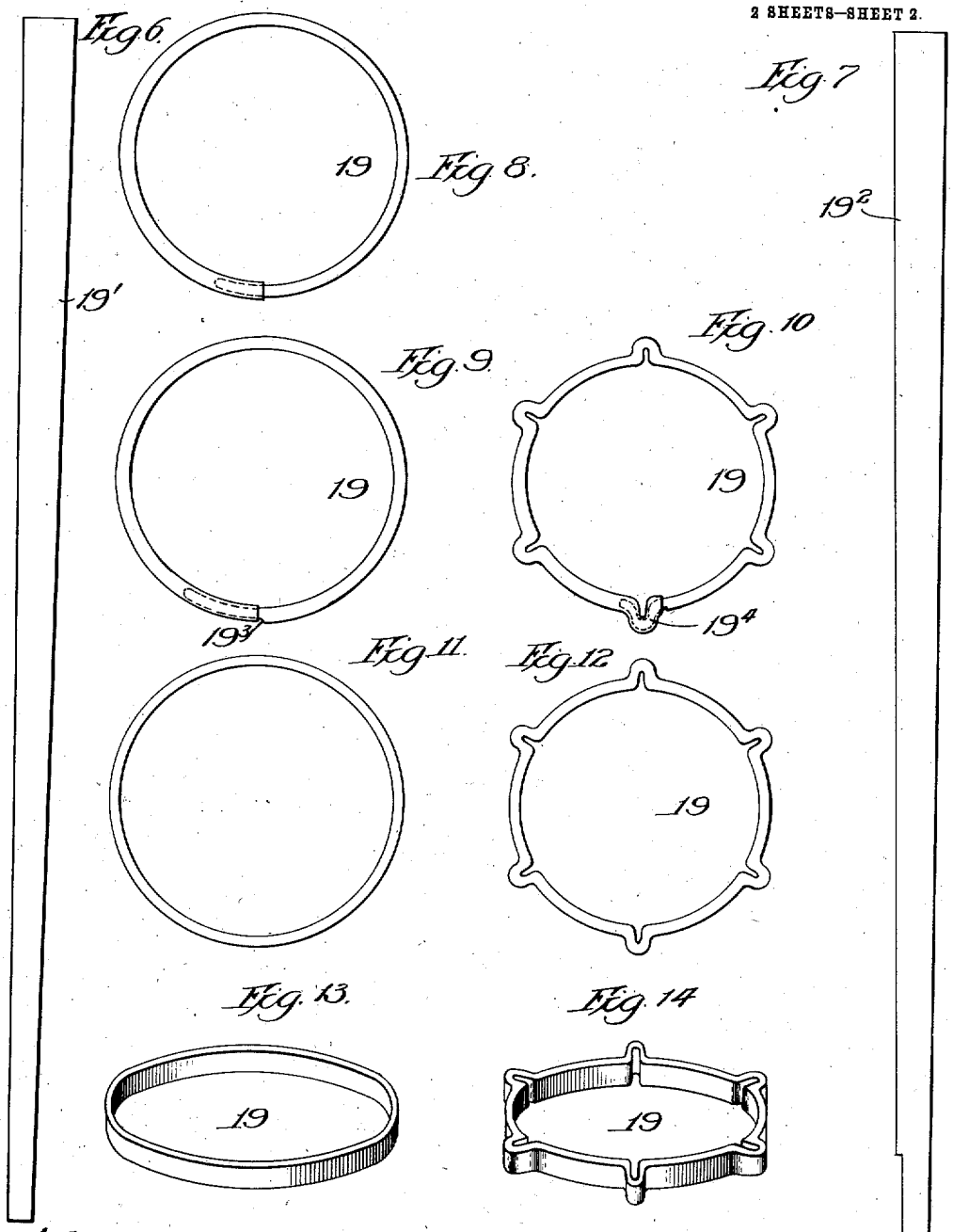
Witnesses:
Geo. C. Davison
Maurice Ledburger
Inventors:
Olof N. Tevander
Arthur Manierre,
By G. L. Gragg
Atty.

UNITED STATES PATENT OFFICE.

OLOF N. TEVANDER AND ARTHUR MANIERRE, OF CHICAGO, ILLINOIS.

METHOD OF SEALING BOTTLES.

13,190. Specification of Reissued Letters Patent. Reissued Jan. 3, 1911.

Original No. 947,502, dated January 25, 1910, Serial No. 483,846. Application for reissue filed June 6, 1910. Serial No. 565,420.

*To all whom it may concern:*

Be it known that we, OLOF N. TEVANDER and ARTHUR MANIERRE, citizens of the United States, residing at Chicago, in the county of Cook and State of Illinois, have invented a new and useful Improvement in Methods of Sealing Bottles, of which the following is a specification.

The object of our invention is to provide for so fastening a cap over the mouth and about the neck of a milk-bottle, jelly-glass or jar, perfume-bottle, and the like, for sealing it, as to avoid the use of any form of stopper to enter the mouth, and to facilitate the sealing operation while rendering the removal of the cap easy and convenient.

Figure 1:
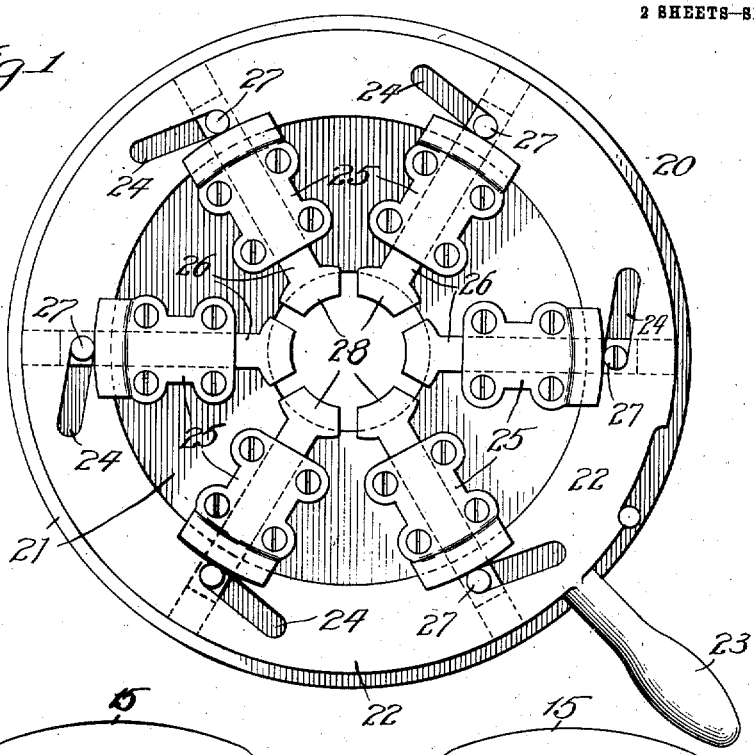
Figure 2:
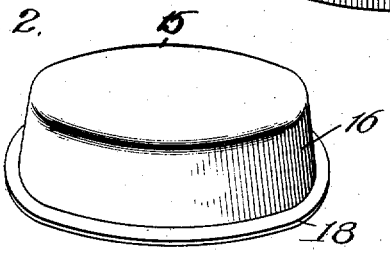
Figure 3:
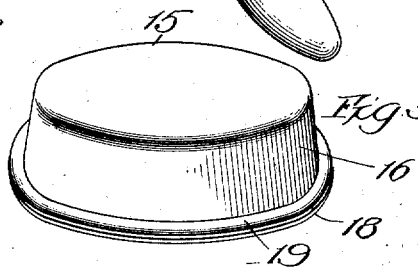
Figure 4:
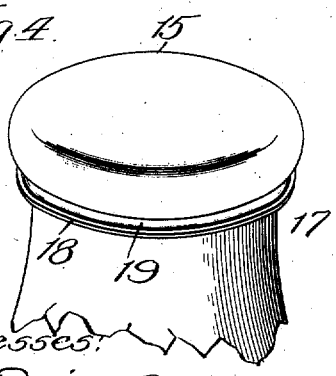
Figure 5:
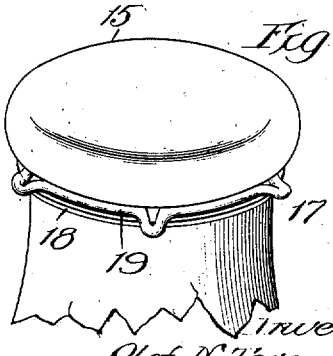

Referring to the accompanying drawings—Figure 1 is a plan view of one of various forms of machines suitable for fastening the metal band about the skirt-portion of a cap for sealing therewith a bottle, or the like, in accordance with our invention. Fig. 2 is a perspective view of a suitable form of cap to be used for the sealing-purpose, and Fig. 3 is a similar view of the cap with a metal band encircling it, ready to be applied to a bottle to be sealed. Fig. 4 is a broken perspective view showing a neck of a milk-bottle sealed in accordance with our invention and employing for the purpose one of various usable forms of metal bands; and Fig. 5 is a similar view of the same showing a wire forming the metal cap-fastening band after being crimped by squeezing it. Fig. 6 is a plan view of a tapered strip of sheet metal suitable for forming a tubular metal fastening-band like that in Fig. 4, and Fig. 7 is a similar view of the same slightly modified to produce a stop in the finished band for the purpose hereinafter explained. Fig. 8 is a plan view of the tubular band made from the strip of Fig. 6, and Fig. 9 is a similar view of such a band made from the strip of Fig. 7. Fig. 10 is a plan view of the band of Fig. 9 showing, somewhat exaggerated, the crimped condition to which it is reduced by fastening it about the skirt of a sealing-cap on a bottle, as in Fig. 5; Fig. 11 is an endless fastening-band of mere wire, and Fig. 12 shows, also somewhat exaggerated, the crimped condition of the same produced by fastening it in its operative position; Fig. 13 is a view, like that presented in Fig. 11, of an endless fastening-band formed of sheet-metal, and Fig. 14 shows the band of Fig. 13 in the likewise exaggerated crimped condition to which it is reduced by fastening it about the skirt-portion of a bottle-sealing cap.

The cap 15 shown may be best formed of comparatively heavy paper, though any other suitable flexible material may be employed; and it is preferably reduced to a permanent cap-form ready for application to seat over and cover the mouth of a bottle and encircle the neck, represented at 17 (Figs. 4 and 5), though it may be a flat piece of the material adapted to be folded into cap-shape over the bottle-mouth and about its neck-portion, either way providing the skirt-portion 16 of the cap, with the advantage in the prepared cap of enabling it to be provided about the free edge of the skirt-portion with a seating-flange 18 for the fastening-band hereinafter described.

With a formed cap applied to a bottle and encircled by a band of flexible metal and of any suitable type, including any of the types illustrated, the band is squeezed or compressed in place to tighten it about the bottle-neck and fasten about the same the skirt-portion of the cap, thus sealing the bottle. This operation may be readily performed by inserting the bottle-neck into and operating against it a suitable machine, such as that illustrated in Fig. 1 and denoted, as a whole, by the reference-character 20. It involves an annular table 21 on which is rotatably confined a ring 22 provided with an operating-handle 23 and containing, at equal intervals apart, similar oblique slots 24; and from a point adjacent to the inner end of each slot a rigid bearing 25 projects radially from the inner edge of the annular bed toward its center. In each bearing is reciprocally supported a similar plunger 26 provided near its outer end with a stud 27 engaging the adjacent cam-slot 24 and terminating at its inner end in a head 28 presenting an arc-shaped face. These heads form about the center of the machine a sectional annulus through which a bottle-neck may be inserted, as by introducing it into the machine from underneath the table 21. With a bottle-neck in the aforesaid annulus and equipped with a band-encircled cap 15, by turning the handle 23 to rotate the ring 22 into the position represented in Fig. 1, the engagement of the cam-slots 24 with the studs 27 advances the plungers 26 simultaneously and uniformly to clamp the band between the heads 28 and fasten it securely in place, as hereinafter described; and turning the handle in the opposite direction effects withdrawal of the plungers and release of the bottle.

As will be understood, dealers in the material contained in the bottles will be equipped with machines, such as the machine 20, for sealing them and also, by preference, with supplies of the caps 15 which are adapted, by their flaring shape, to be shipped to them in nested condition with a band 19 about each, bearing against the flange 18, ready for applying the cap in place and subjecting the band to the action of the machine. A desirable type of the band is that shown in Fig. 8, which is produced from a sheet-metal strip $19^1$ (Fig. 6) by bending it lengthwise upon itself into a tapering tube and reducing this tube into circular form with the narrower end telescoping the wider end. In subjecting this band to the action of the machine 20, the encircling plungers compress it about the skirt of the sealing-cap to tighten it against the latter, thereby forcing and wedging the narrower end into the wider end of the annular tube. This same type of band may be produced in the form represented in Fig. 9 from the tapering sheet-metal strip $19^2$ of Fig. 7, which differs from that of Fig. 6 in containing an offset in its narrower end-portion. This offset presents, in the band of Fig. 9, a shoulder $19^3$ forming a stop which prevents the action of the machine from driving the narrower into the wider end of the tubular band; so that when the plungers 26 are caused to exert their pressure against this band, which should be set in the machine to bring the telescoping sections into the path of one of the plunger heads, the exertion by the heads of the circumferential compression on the band will crimp it into the shape or approximately the shape illustrated in Fig. 10, one of the crimps being formed at the telescoping joint to clench it, as represented at $19^4$. The bands of Figs. 11 and 13 are endless, the first-named being formed of non-resilient wire of round cross-section and the other of sheet-metal. Obviously, being endless, as is, practically, the band of Fig. 9, the compression-action upon them of the plungers in the machine will crimp them, as represented by the wire band of Fig. 12 and by the sheet-metal band of Fig. 14. In every instance, however, the band is tightened by squeezing it about the cap-skirt by extraneous pressure other than or in addition to that inherently possessed by the band to fasten the cap into sealing condition upon the bottle. This mode of fastening the cap in place renders it readily removable for emptying the contents of the bottle, since to free it all that is required is to force the band, as with a fork or other suitable implement, applied to any point thereon, past the flanged edge of the cap, thereby permitting the latter to be readily pulled or torn off; or, if desired, the crown-portion of the cap may be cut away, thus opening the bottle without disturbing the band.

Our improvement is peculiarly effective in its purpose in connection with bottles with circumferentially-beaded mouths, like the representations in Figs. 4 and 5, since, in compressing the band in the manner described, it tends to stretch the cap-skirt about the bead and thus draw the cap tautly over the bottle-mouth, thereby effectually sealing the bottle because of the closeness and unyielding character of the seal, rendered so by compressing the band as described.

While the extraneous pressure is herein shown as being initially applied upon a disjointed circumferential line we do not wish to be limited to the division of the circumferential line of pressure into sections as an important feature of our invention resides in the application of pressure at a plurality of well separated points whether or not the pressure continuously intervenes between such points, nor do we desire to be limited to the application of the pressure in a plane angular to the length of the bottle.

We reserve the article produced by our method of sealing for the subject of a future application for Letters Patent.

What we claim as new and desire to secure by Letters Patent is—

1. The method of sealing a bottle, or the like, which consists in seating a flexible cap over the mouth of the bottle with the skirt-portion of the cap extending about the neck of the bottle, applying a ring of flexible-metal about said skirt-portion, and diametrically contracting said ring by circumferential pressure simultaneously applied at different points thereof to tighten it about the neck of the receptacle and thereby fasten the cap in place.

2. The method of sealing a bottle, or the like, which consists in seating a flexible cap over the mouth of the bottle with the skirt-portion of the cap extending about the neck of the bottle, applying a ring of flexible-metal about said skirt-portion and crimping said ring by circumferential pressure simultaneously applied at different points thereof to tighten it about the neck of the bottle and thereby fasten the cap in place.

3. The method of sealing a bottle, or the like, which consists in seating a flexible cap over the mouth of the bottle with the skirt-portion of the cap extending about the neck of the bottle, applying a ring of flexible-metal about said skirt-portion and diametrically contracting said ring by circumferential pressure simultaneously applied at different points thereof, whereby said ring and the skirt-portion of the cap are crimped together at such points of pressure and the cap is fastened in place.

4. The method of sealing a bottle or the like, which consists in placing over the mouth of the bottle and about the neck of the bottle a flexible cap, and about the neck of the bottle and the flexible cap a closure retaining member of metal, and contracting said metal member into holding engagement with the closure and bottle by extraneous pressure substantially simultaneously applied at three or more points thereof to tighten the member about the neck of the bottle, thereby to hold the cap in engagement with the bottle.

5. The method of sealing a bottle or the like, which consists in placing over the mouth of the bottle and about the neck of the bottle a flexible cap, and about the neck of the bottle and the flexible cap a closure retaining member of metal, and contracting said metal member into holding engagement with the closure and bottle by extraneous pressure applied at three or more points thereof to tighten the member about the neck of the bottle, thereby to hold the cap neck of the bottle, thereby to hold the cap in engagement with the bottle.

6. The method of sealing a bottle or the like, which consists in placing over the mouth of the bottle and about the neck of the bottle a flexible cap, and about the neck of the bottle and the flexible cap a metal closure retaining member, and contracting said metal member into holding engagement with the closure and bottle by extraneous pressure applied at a plurality of well separated points to tighten the member about the neck of the bottle thereby to hold the cap in engagement with the bottle.

OLOF N. TEVANDER.
ARTHUR MANIERRE.

In presence of—
G. L. Cragg,
R. E. Atherton.